United States Patent [19]
Swann et al.

[11] Patent Number: 5,535,995
[45] Date of Patent: Jul. 16, 1996

[54] APPARATUS FOR SUPPORTING MULTIPLE VISE-LIKE WORKHOLDING DEVICES

[75] Inventors: George R. Swann, Gibsonia; James L. Hartman; James B. Krebs, both of Pittsburgh, all of Pa.

[73] Assignee: Chick Machine Tool, Inc., Warrendale, Pa.

[21] Appl. No.: 300,605

[22] Filed: Sep. 2, 1994

[51] Int. Cl.⁶ .................................................. B25B 1/20
[52] U.S. Cl. ................ 269/43; 269/152; 269/242; 269/283; 269/309; 269/900
[58] Field of Search .............. 269/43, 152, 242, 269/282, 283, 309, 310, 900, 906

[56] References Cited

U.S. PATENT DOCUMENTS

| | | | |
|---|---|---|---|
| 2,535,450 | 12/1950 | O'Malley et al. | 81/33 |
| 2,707,419 | 5/1955 | Schron | 269/152 |
| 2,764,047 | 9/1956 | Allbritton | 269/283 |
| 4,098,500 | 7/1978 | Lenz | 269/136 |
| 4,413,818 | 11/1983 | Lenz | 269/81 |
| 4,529,183 | 7/1985 | Krason et al. | 269/43 |
| 4,585,217 | 4/1986 | Erickson | 269/56 |
| 4,898,371 | 2/1990 | Mills et al. | 269/136 |
| 4,921,378 | 5/1990 | Kytölä | 409/221 |
| 4,928,937 | 5/1990 | Bernstein | 269/136 |
| 4,934,674 | 6/1990 | Bernstein | 269/43 |
| 5,022,636 | 6/1991 | Swann | 269/43 |
| 5,024,427 | 6/1991 | Swann | 269/136 |
| 5,064,321 | 11/1991 | Barnes | 409/219 |
| 5,094,436 | 3/1992 | Stephan, III | 269/153 |
| 5,098,073 | 3/1992 | Lenz | 269/43 |

OTHER PUBLICATIONS

Bi-Lok Tech Package Brochure, Chick Machine Company, 1988.
Chick M-Series Brochure, Chick Machine Tool, Inc., Aug. 1993.
Chick Vise Fixturing Brochure, Chick Machine Tool, Inc., 1992.

*Primary Examiner*—Bruce M. Kisliuk
*Assistant Examiner*—Thomas W. Lynch
*Attorney, Agent, or Firm*—Kirkpatrick & Lockhart

[57] ABSTRACT

An adaptor member for mounting a column that operably supports at least two vise-like clamping assemblies in a predetermined orientation on a support surface of a milling table. The vise-like clamping assemblies include movable support members that protrude from a corresponding surface of the column and have removable jaw members attached thereto. The adaptor member is equipped with cavities adapted to receive therein the movable support members of a clamping assembly to enable the column to be supported on the adaptor member. Locating members are provided to locate a surface of the column member relative to the adaptor member in a predetermined confronting orientation. The column member is removably attached to the adaptor member using pins that are also used to removably attach the jaw members to their corresponding movable support members.

21 Claims, 6 Drawing Sheets

APPARATUS FOR SUPPORTING MULTIPLE VISE-LIKE WORKHOLDING DEVICES

BACKGROUND OF THE INVENTION

1. Field of the Invention

The present invention relates to workholding apparatuses and, more particularly, is directed to apparatuses for supporting multiple vise-like workholding devices in predetermined orientations on a support surface such as a machine tool table or tooling plate.

2. Description of the Invention Background

Today, most modern machine shops are typically equipped with one or more computer numerically controlled ("CNC") machining apparatuses which can perform very precise machining operations on "workpiece(s)" at very high speeds. However, because such CNC machining devices typically cost several thousands of dollars and require a substantial economic investment to support their operation, it is desirable to keep that equipment operating as close to one hundred percent of the time as possible. The time that a CNC machining device remains idle while workpieces are being handled or manipulated to other machining orientations represents a loss in efficiency of use of the machine and, ultimately, a loss in the profitability of the workpieces or an increase in their cost.

A single CNC machine can generally perform a variety of different "machining" operations on a workpiece. For example, a CNC milling machine can be utilized for many machining operations including producing flat ends on workpieces, producing planar surfaces on workpieces, and drilling, tapping, and reaming holes in workpieces. A typical CNC milling machine is equipped with a vertically or horizontally mounted spindle that has a toolholder attached thereto. The toolholder is constructed to operably receive and support a tool therein which may comprise an end mill for producing flat ends, a flycutter for producing planar surfaces, a drill for drilling holes, a tap for producing threaded holes or a reamer for sizing holes to very precise dimensions.

Such milling machines are equipped with a milling table that is adapted to support workpieces or workpiece-supporting apparatuses commonly known as "workholders" thereon. A milling table is typically coupled to the milling machine by means including computer-controlled positioning devices. The table and/or spindle can be moved relative to one another very precisely along "x", "y" and "z" axes. Such relative movement defines a cubical area known as the "machining envelope" in which the milling machine is capable of performing various machining operations therein. As such, to maximize the machine's production, it is desirable to support as many workpieces as possible in machining orientations within the machine's machining envelope to reduce the amount of machine downtime encountered when replacing or reorienting workpieces within the machining envelope.

To achieve very accurate workpiece dimensions, the workpiece(s) must be supported within the machining envelope in very precise location(s) that are recognized by the computer. The workpiece(s) may be supported within the machining envelope by tool fixtures or clamps that are attached to the milling table or they may be supported in vise-like workholders such as the ones disclosed in U.S. Pat. No. 4,928,937 to Bernstein, U.S. Pat. No. 4,898,371 to Mills et al., U.S. Pat. No. 4,569,509 to Good, and U.S. Pat. No. 4,098,500 to Lenz. As can be gleaned from review of those patents, such vise-like workholders are adapted to clamp a single workpiece between opposing jaw members operably supported on a base that is adapted to be clamped or attached by other known locating and attachment methods to the milling table.

Depending upon the size(s) of the workpiece(s) to be machined, a plurality of such "single-station" vise-like workholders can be attached to the milling table or to a "tooling plate" adapted to be attached to the workholding table. Such workholders, however, due to their limited ability to secure numerous workpieces within the machining envelope (1) do not serve to maximize the use of a machine's machining envelope and, (2) thus, increase the amount of machine downtime. Moreover, such workholders typically only serve to present workpieces in a single machining orientation to the machine's spindle.

For most multiple-workpiece machining operations, vise-like workholders, that are each capable of holding two or more workpieces in side-by-side orientations, are more desirable than the workholders described above. Examples of such "two-station" workholders are disclosed in U.S. Pat. No. 5,098,073 to Lenz, U.S. Pat. No. 5,022,636 to Swann, U.S. Pat. No. 4,934,674 to Bernstein, and U.S. Pat. No. 4,529,183 to Krason et al. Such workholders typically comprise a base that has a central jaw fixed thereto. Two outer jaws are operably supported on the base and can be selectively positioned relative to the fixed central jaw by a vise screw that is operably received in a longitudinal slot provided in the base. Again, however, those workholders do not make full use of the machine's machining envelope and, in most cases, can only present the workpieces in a single machining orientation.

Another workholding device of the type disclosed in U.S. Pat. No. 4,413,818 to Lenz, comprises a vise that has a base that operably supports two vise-like jaws on one side thereof. The remaining three sides of the base are configured for attachment to the machine tool table. While this vise or a plurality of such vises can be used to clamp workpiece(s) in essentially three different machining orientations, such vises fail to make substantial use of the machining envelope in the vertical direction because they must be attached to the milling table or a tooling plate attached to the milling table.

Another workholding device is disclosed in U.S. Pat. No. 2,535,450 to O'Malley. This device has two pairs of workholding jaws oriented at ninety degrees to each other. Thus, this workholding device can simultaneously support at least two workpieces in two different machining orientations relative to the milling table. While such workholding device makes further use of the machining envelope, it still does not maximize the use of the machining envelope, especially in the "Z" direction.

U.S. Pat. No. 5,094,436 to Stephan, III discloses a two stage machine vise, a plurality of which can be mounted to a common vertical support member that has an upper base and a lower base attached thereto. The lower base is adapted for attachment to the milling table or tooling plate that is attached to the milling table. This patent also teaches that this assembly of machine vises can be supported in a horizontal orientation. Such arrangements of workholders serve to further maximize the utilization of the machining envelope.

Perhaps, however, the vise-like workholders manufactured by Chick Machine Tool, Inc. of 800 Commonwealth Drive, Warrendale, Pa. 15086 under the trademarks "Multi-Lok", "Quick-Lok", and "Bi-Lok", serve to better utilize the machining envelope by providing a plurality of vise-like jaws operably configured on a common column member. The "Quick-Lok" and "Bi-Lok" vise-like workholders are "two-station" workholders that have a base with a fixed central jaw attached thereto. Two outer jaws are operably supported on the base and can be selectively positioned relative to the fixed central jaw by a vise screw that is operably received in a longitudinal slot provided in the base. The bases of those workholders can be attached directly to the milling table or tooling plate or they can be attached to a common support member designed to orient the workholders in predetermined orientations relative to the machine tool table or tooling plate.

The "Multi-Lok" workholders produced by Chick Machine Tool, Inc. are also two stage workholders that comprise a vise-like clamping assembly that is equipped with first and second movable jaw supports to which first and second jaw members may be removably attached. The clamping assembly is configured to be operably received on a single base having a longitudinal slot sized to slidably receive the clamping assembly therein. A central jaw is fixed to the base such that it is oriented between the first and second jaws to create a two-station workholder. Multiple clamping assemblies may be received in corresponding slots in a common column member to provide a cluster of workholders. Such column member can be vertically supported on a milling table such that the longitudinal axes of the clamping assemblies are substantially perpendicular to the milling table or other support surface or they can be rotatably supported on a selectively indexable support apparatus. However, to attach such columns to a support surface that is essentially parallel to the axes of the clamping assemblies in the column, the column must have a surface that is specially configured for attachment to the support surface. Thus while such column is well adapted to support a plurality of vise-like clamping assemblies on a milling table or tooling plate such that the axes thereof are substantially parallel to the milling table or tooling plate, when it is desirable to use that same column to support the clamping assemblies such that the axes thereof are substantially perpendicular to the milling table or tooling plate, the side of the column used to attach to the milling table in the horizontal orientation typically cannot be equipped with its own clamping assembly.

Thus, there is a need for an apparatus that can support a standard column with multiple vise-like clamping assemblies operably supported thereon on a tooling plate such that the axes of the clamping assemblies are substantially parallel to the tooling plate's support surface without sacrificing the column's ability to operably support a maximum number of slide assemblies when the column is mounted such that the slide axes are substantially perpendicular to the support surface.

SUMMARY OF THE INVENTION

In accordance with a particular preferred form of the present invention, there is provided an adaptor member for supporting a workholding assembly on a support surface wherein the workholding assembly comprises a column that has at least two longitudinal surfaces that each have a longitudinal cavity therein and a corresponding center jaw removably attached thereto. First and second movable support members are operably received within each longitudinal cavity for selective longitudinal movement therealong toward and away from the corresponding center jaw. The first and second movable support members have corresponding first and second extended portions, respectively, that protrude from the corresponding longitudinal cavity to have corresponding first and second removable jaw members attached thereto. The present device, in a preferred form, comprises an adaptor member that is capable of attachment to the support surface in a predetermined orientation. The adaptor member has a column receiving surface that is adapted to receive, in confronting relationship, a longitudinal column surface from which the corresponding center jaw and first and second jaw members have been removed. The column receiving surface is provided with first and second cavities that are adapted to receive the first and second extended portions, respectively, that correspond to the longitudinal column surface received thereon. The present device further comprises apparatus for locating the longitudinal column surface received on the column receiving surface in a predetermined confronting orientation.

Thus, it is an object of the present invention to provide a member for mounting a standard column member that supports at least two similar vise-like workholding assemblies that utilizes the components of one workholding assembly to attach the column to the member in a precise predetermined orientation.

Accordingly, the present invention addresses the forgoing problems associated with prior workholding assemblies. In particular, the present invention enables standard column assemblies to be mounted in various orientations on a support surface without having to dedicate at least one surface of the column for mounting purposes regardless of the mounting orientation. Now, a standard column can be mounted in a vertical orientation with the axes of the clamping assemblies thereof being substantially perpendicular to the support surface to which the column is mounted and utilize all of the column's workholder supporting surfaces. The same column, however, can now also be mounted such that the axes of the clamping assemblies supported therein are substantially parallel with a support surface simply by removing the workholding jaws corresponding to one of the column surfaces and thereafter attaching the column to the present adaptor member in the manner taught herein. The skilled artisan will therefore appreciate that the present adaptor member eliminates the need for having separate "horizontal" and "vertical" workholding columns while providing apparatus that enables the machining envelope of a CNC machining device to be better utilized.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF PREFERRED EMBODIMENTS

Figure 1:
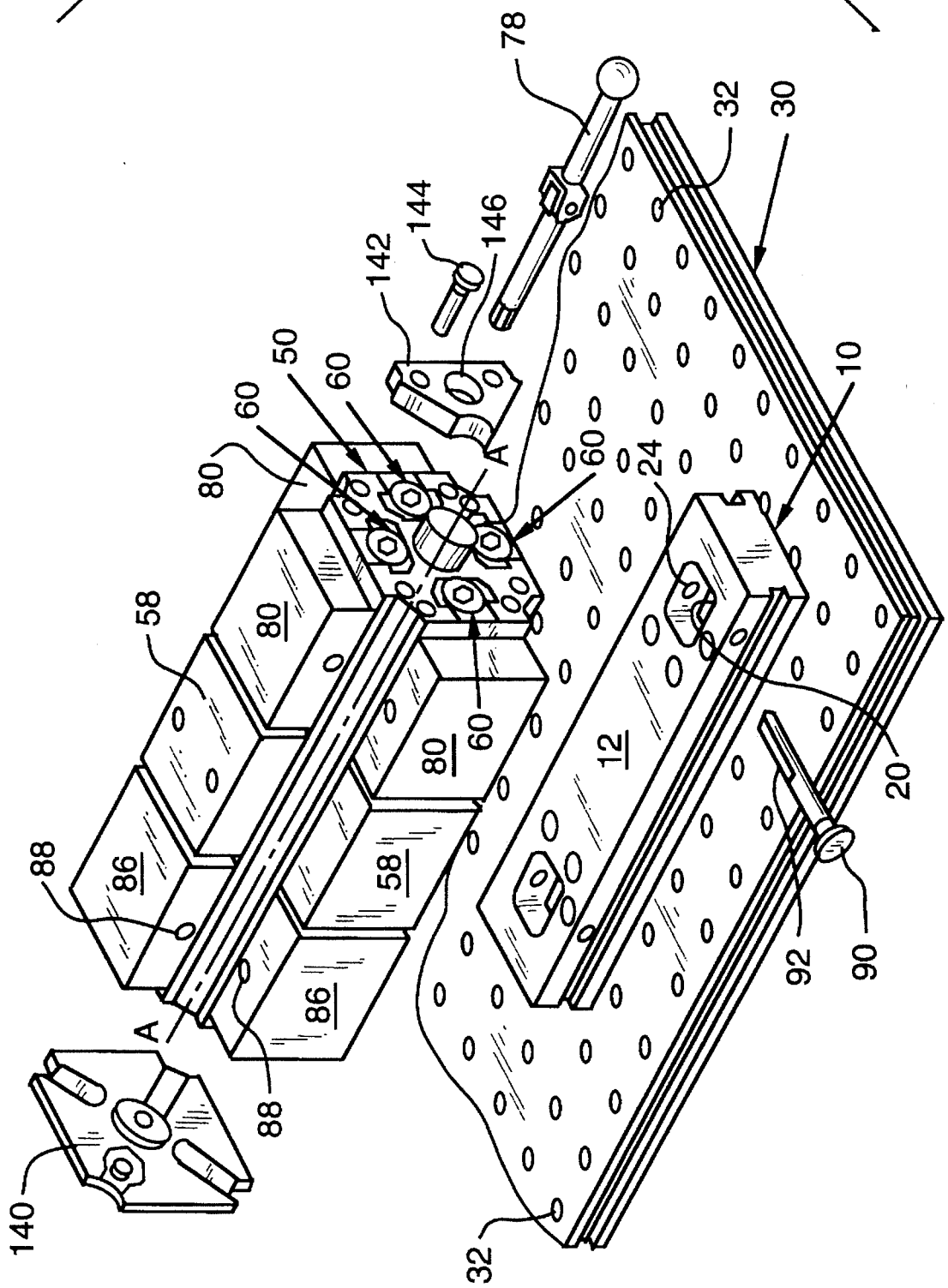
FIG. 1 is an isometric exploded assembly view of an adaptor member of the present invention in relation to a column supporting a plurality of vise-like clamping assemblies and a support plate.

Referring now to the drawings for the purposes of illustrating present preferred embodiments of the invention only and not for purposes of limiting the same, the Figures illustrate a preferred adaptor member 10 of the present invention attached to a tool plate 30 and arranged to support and receive a workholder supporting column 50 thereon. The column 50 depicted in the present Figures comprises an elongated metallic structure typically fabricated from a high strength aluminum material having four longitudinal surfaces 52 thereon. The skilled artisan will readily appreciate, however, the adaptor member 10 of the present invention can be used to support columns of various other shapes and constructions without departing from the spirit and scope of the present invention.

Figure 2:
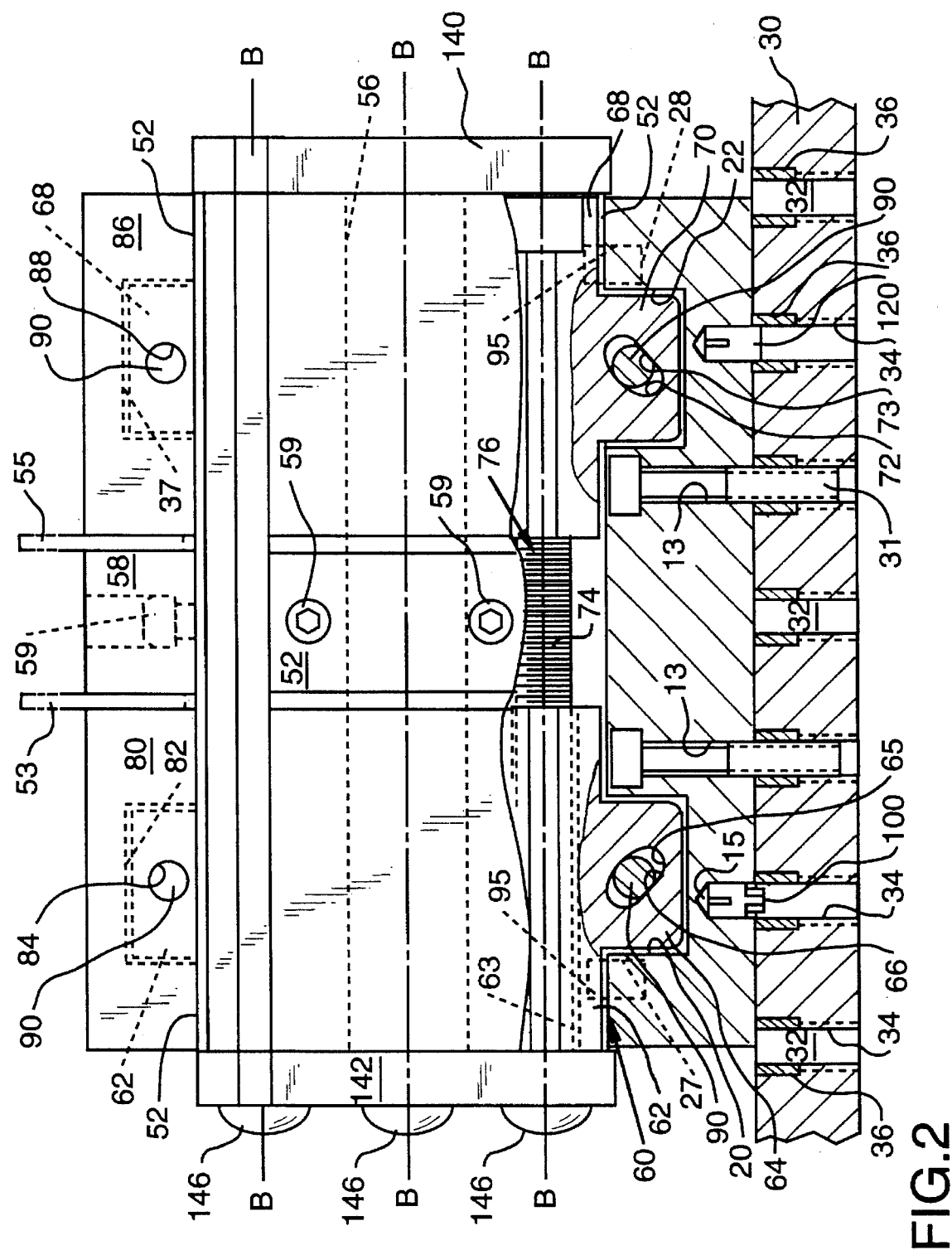
FIG. 2 is side elevational view of the column of FIG. 1 supported on the adaptor member of FIG. 1 with some elements shown in cross-section for clarity.

As can be seen in FIGS. 1 and 2, the column 50 has a longitudinal axis "A—A". A longitudinally extending cavity 54 having a longitudinal axis "B—B" is preferably provided in each surface 52 of the column 50 such that each axis "B—B" is substantially parallel to axis "A—A". Each longitudinal cavity 54 defines a corresponding slot 56 having two longitudinally extending side rail members 57. In addition, a corresponding clamping assembly, generally designated as 60, is provided for longitudinal movement within each cavity 54. The clamping assemblies 60 are preferably of the type disclosed in U.S. Pat. No. 5,024,427, the disclosure of which is herein incorporated by reference. In addition, in this embodiment, the clamping assemblies 60 are preferably identical in construction. As such, a single clamping assembly will be herein described with it being understood that all of clamping assemblies 60 are of identical construction.

In general, a clamping assembly 60 preferably comprises a first movable support member 62 and a second movable support member 68 which are each adapted to be received within a corresponding slot 56 in the column 50. The clamping assembly 60 also preferably includes a screw shaft 74 that is sized to be received within a corresponding slot 56 in the column member 50. The screw shaft 74 preferably has threads 76 which are intended to engage a threaded bore 63 within the first movable support member 62. See FIG. 2. In addition, the screw shaft 74 includes means (not shown) for engaging and displacing the second movable support member 68 thereon. The screw shaft 74 passes through the secondary movable support member 68 while the other end of the screw shaft 74 is configured to receive an allen wrench 78 preferably of the type shown in FIG. 1; however, other wrenches, tools or machines may also be used to selectively supply rotary motion to the screw shafts 74 received within the cavities 54 of the column 50.

A "first" center jaw 58 corresponds with each surface 52 and is preferably attached thereto intermediate the column ends in a predetermined position as shown in FIGS. 1 and 2. In a preferred embodiment, each center jaw 58 is removably attached to its corresponding surface 52 by cap screws 59. Locating arrangements, usually pins or keys, that are known in the art may be used to precisely locate each center jaw member 58 on a corresponding surface 52 of the column 50 in a precise location. Other locating arrangements, such as the one disclosed in co-pending U.S. Patent Application entitled "Apparatus For Positioning An Element On A Surface", Ser. No. 08/300,375, filed Sep. 21, 1994, and owned by Chick Machine Tool, Inc. of Warrendale, Pa. the disclosure of which is herein incorporated by reference, may also be used in those instances wherein each center jaw 58 must be attached to the column 50 in very precise predetermined positions.

As shown in FIG. 2, a "first" jaw member 80 corresponds with each first movable support member 62 and is preferably removably attached thereto. Similarly, a second jaw member 86 corresponds with each second movable support member 68 and is removably attached thereto. The jaw members (80, 86) are preferably similar to those workholding jaw portions disclosed in U.S. Pat. No. 5,024,427 entitled "Quick Change Head For Precision Machine Vise" the disclosure of which is also herein incorporated by reference. As such, in the present "Detailed Description Of Preferred Embodiments", the basic jaw structure of the clamping assembly 60 will be described in general terms, it being understood that the particular details of the jaw member construction, with the exception of those features which are described hereinbelow forming these embodiments of the present invention, may be gleaned from a review of that patent.

Figure 3:
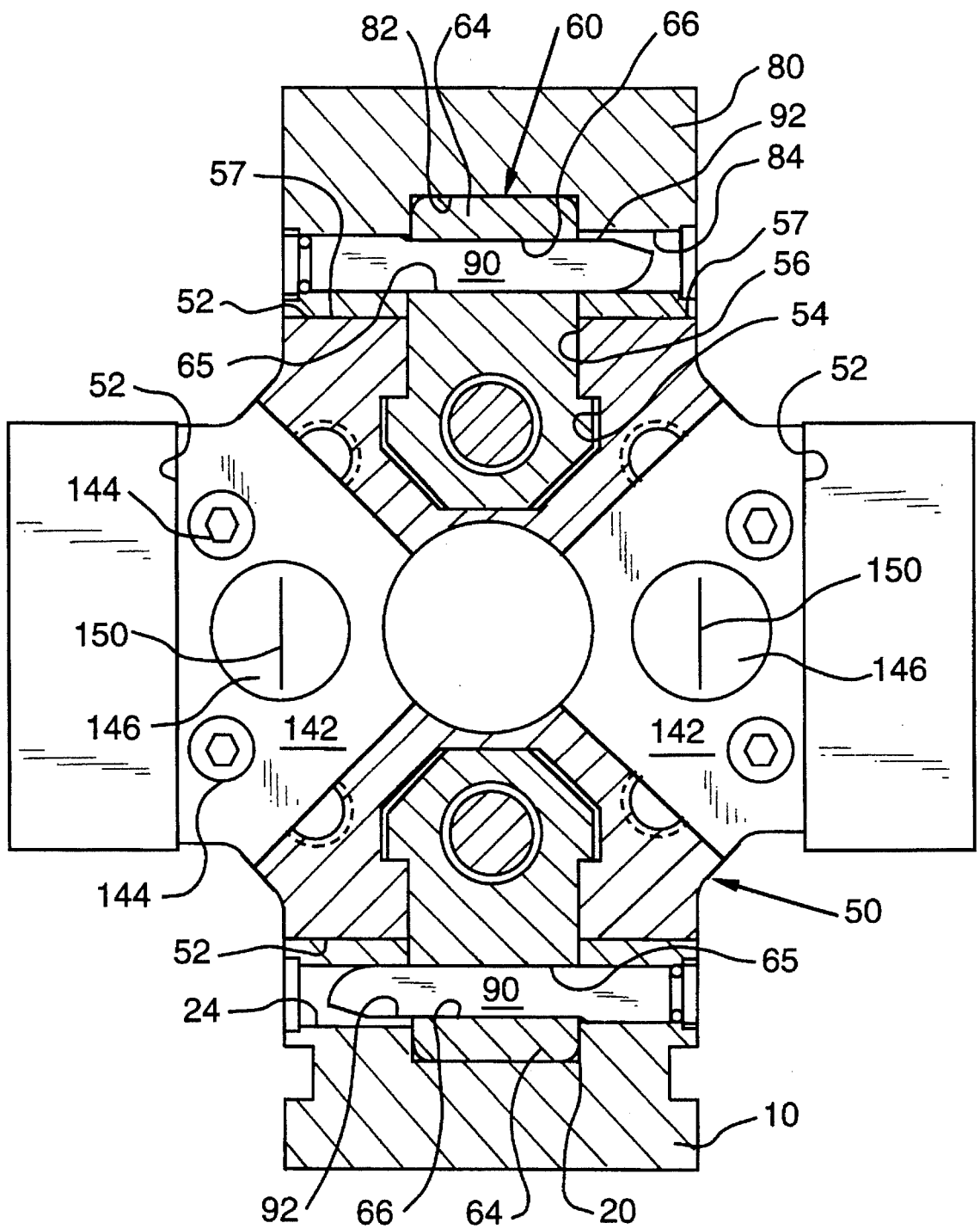
FIG. 3 is an end elevational view of the column and endplate assembly of FIG. 2, showing some elements in cross-section for clarity.

In general, as can be seen in FIGS. 2 and 3, each first movable support member 62 has a "first" extended portion 64 that extends beyond the corresponding surface 52. See FIG. 2. The first extended portion 64 has a "first" transverse bore 65 extending therethrough that has a "first" flat surface 66 machined therein. Similarly, each second movable support member 68 has a "second" extended portion 70 that extends beyond the corresponding surface 52. The second extended portion 70 has a "second" transverse bore 72 that extends therethrough that has a "second" flat surface 73 machined therein. In addition, each first jaw member 80 preferably has a "first" cavity 82 therein that is sized to receive a "first" extended portion 64 of a corresponding first movable support member 62. A "primary" transverse bore 84 is preferably provided through the first jaw member 80 such that the primary transverse bore 84 will be substantially coaxially aligned with the first transverse bore 65 when the first extended portion 64 is received within the first cavity 82 in the first jaw 80. See FIG. 3. Also, each second jaw member 86 preferably has a "second" cavity 87 therein that is sized to receive a second extended portion 70 of a corresponding second movable support member 68. Also, a "secondary" transverse bore 88 is preferably provided through the second jaw member 86 such that the secondary transverse bore 88 will be substantially coaxially aligned with the second transverse bore 72 when the second extended portion 70 is received within the second cavity 87 in the second jaw member 86.

The first jaw members 80 are preferably removably attached to their corresponding first movable support members 62 and the second jaw members 86 are preferably removably attached to their corresponding second movable support members by removable pins 90. The preferred construction of pins 90 is set forth in detail in U.S. Pat. No. 5,024,427, the disclosure of which was incorporated by reference hereinabove. In general terms, however, each pin 90 has a planar portion 92 which is adapted to be brought into contact with the flat surfaces (66, 73) in bores (65, 72). In particular, each first jaw 80 is preferably removably attached to a corresponding first movable support member 62 by inserting a corresponding pin 90 through the coaxially aligned bores 84 and 65 such that the planar portion 92 of the pin 90 engages the first flat surface 66 of the first transverse bore 65. Similarly, each second jaw 86 is preferably removably attached to a corresponding second movable support member 68 by inserting a corresponding pin 90 through the coaxially aligned bores 88 and 72 such that the planar portion 92 of the pin 90 engages the second flat surface 73 of the second transverse bore 72.

As can be seen in FIG. 2, each center jaw 58 is arranged on a corresponding surface 52 of the column 50 such that the corresponding first and second movable support members (62, 68) may move toward and away from the corresponding center jaw member 58 to cause, for example, workpieces 53 and 55 to be clamped between the center jaw 58 and first and second jaws (80, 86). For example, when the screw shaft 74 is rotated, the first movable support member 62 is moved relative to the center jaw 58, thereby causing the first jaw 80 to move toward the center jaw 58 to clamp a first workpiece 53 therebetween. In addition, the rotation of the screw shaft 74 and its movement relative to the first movable support member 62 causes the second movable support member 68 to move toward the center jaw member 58 to cause the second jaw member 86 to engage and restrain a second workpiece 55 between the second jaw member 86 and the center jaw member 58.

While it will be apparent to the skilled artisan that the first and second jaw members (80, 86)can be removably attached to their corresponding first and second movable support members (62, 68), respectively, by a variety of other known fastening arrangements, one unique advantage provided by this embodiment of the present invention is the ability to attach the column 50 to the adaptor member 10 utilizing the same pins 90 that are used to attach the first and second jaw members (80, 86). The reader will obtain a greater appreciation of this advantage from the detailed description that follows.

Figure 4:
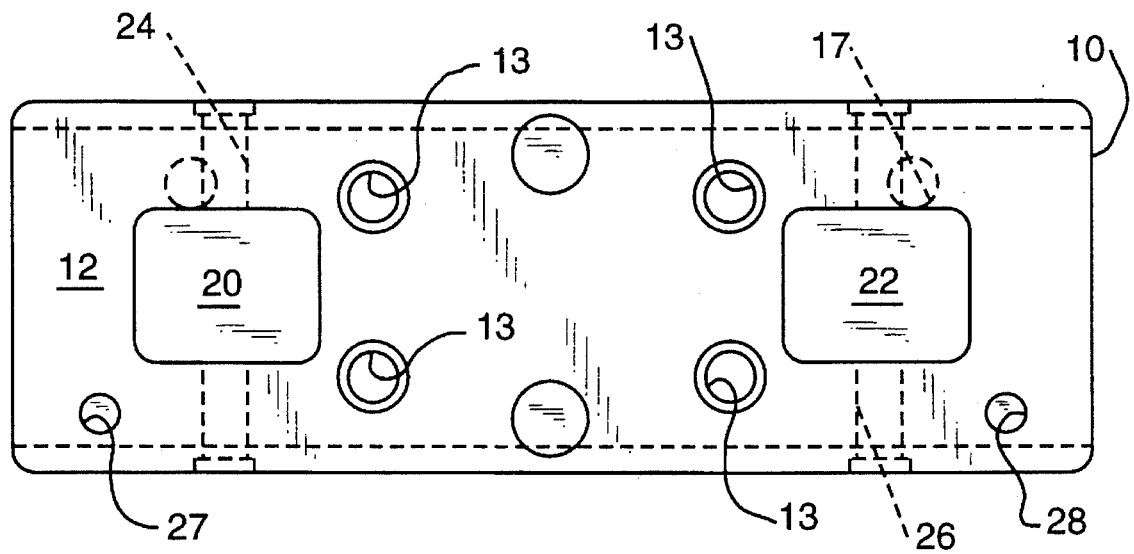
FIG. 4 is a plan view of a preferred adaptor member of the present invention.
Figure 5:
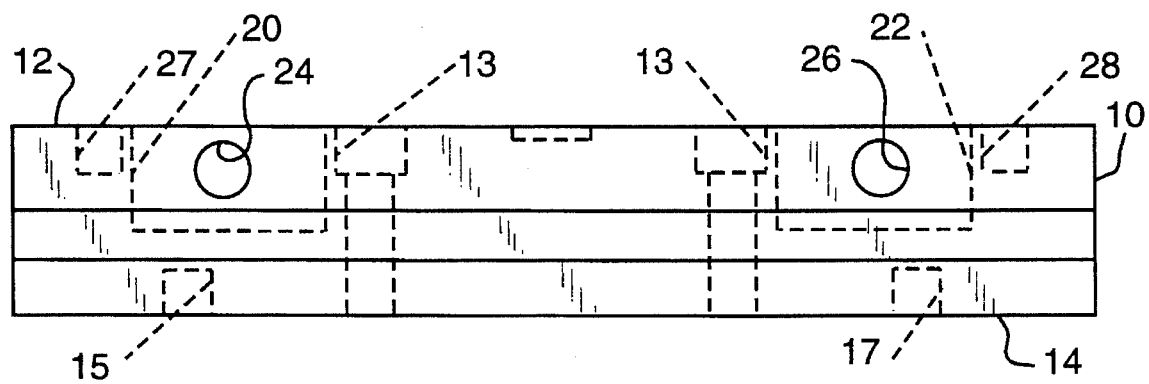
FIG. 5 is a side elevational view of the adaptor member of FIG. 4.
Figure 6:
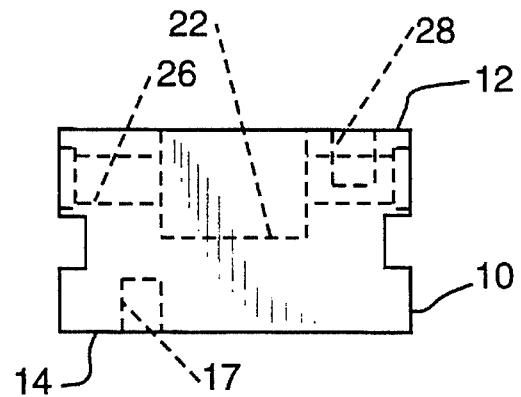
FIG. 6 is an end view of the adaptor member depicted in FIGS. 4 and 5.
Figure 7:
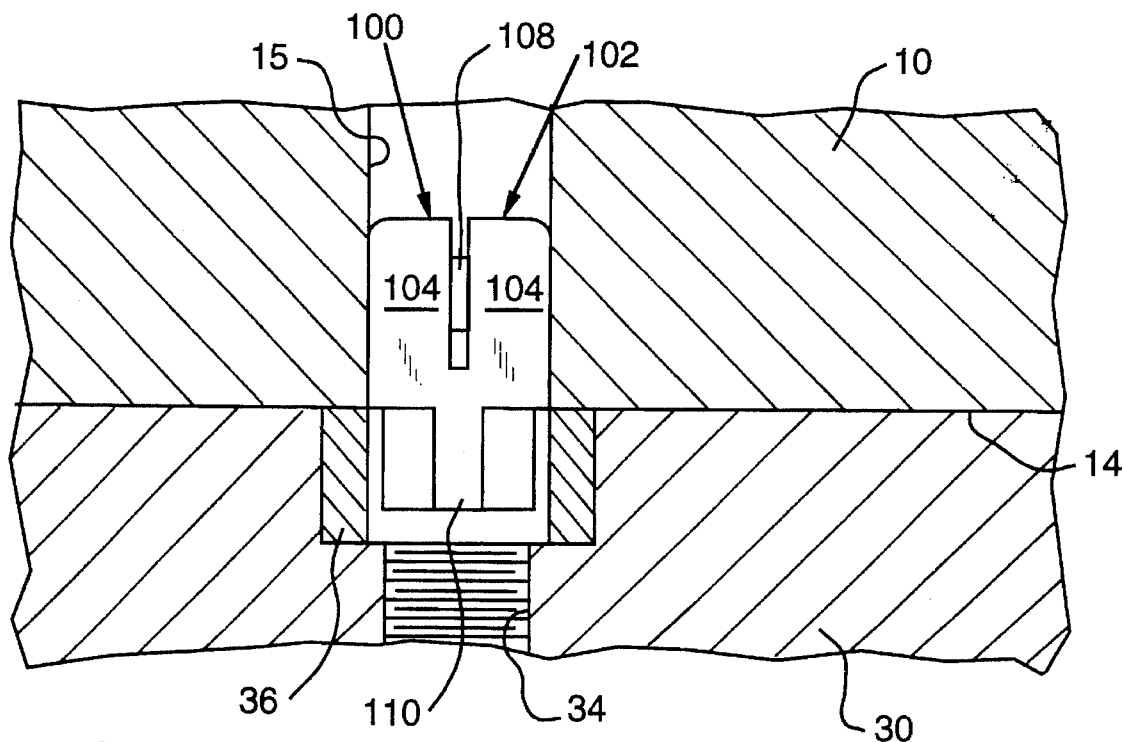
FIG. 7 is a partial cross-sectional assembly view of a column received on a preferred adaptor member of the present invention showing a preferred removable locating pin received in a corresponding bore in the adaptor member.
Figure 10:
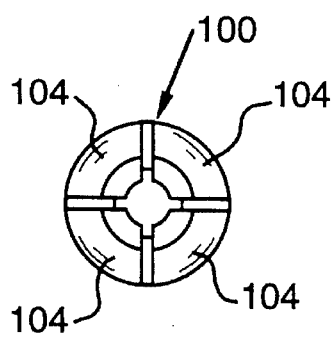
FIG. 10 is view of the opposite end of the removable locating pin of FIG. 9.

More specifically and with reference to FIGS. 4–6, the adaptor member 10, in a preferred form, comprises an elongated plate member fabricated from high strength aluminum material. The skilled artisan will appreciate, however, that the adaptor member 10 may be provided in other configurations so long as they function in accordance with this invention and may be fabricated from a variety of other suitable materials. Preferably, the adaptor member 10 has a planar receiving surface 12 adapted to receive and support thereon one of the surfaces 52 of the column 50. The adaptor member 10 also has an attachment surface 14 that is adapted to be received on the surface of a support plate 30 that has a plurality of bores 32 therein arranged in a predetermined array of orthogonally arranged rows and columns. Support or "tooling" plates of this type are known in the art and, therefore, will not be discussed herein in great detail.

As can be seen in FIG. 2, each bore 32 preferably has a lower threaded portion 34 and a locating bushing 36 secured therein that is fabricated from hardened tool steel. The adaptor member 10 is preferably provided with a first removably attachable locating pin 100 that is shown in FIGS. 7–10. As can be seen in those FIGS., locating pin 100 is preferably of the type manufactured by Chick Machine Tool, Inc. under Part No. PIN12D and, in general, has an expandable upper portion 102 sized to be received in an attachment bore 15 provided in the attachment surface 14 of the adaptor member 10. Locating pin 100 also has a "diamond" shaped lower portion 110 adapted to be received in any one of the locating bushings 36 of support plate 30. See FIG. 7. The lower portion 110 has a threaded bore 112 extending therethrough that is adapted to receive a threaded set screw 114 assembly therein. The upper portion 102 preferably comprises four arcuate segments 104 that define an axial passage 106 therebetween that is substantially coaxially aligned with the threaded bore 112 in the lower portion 110.

Figure 8:
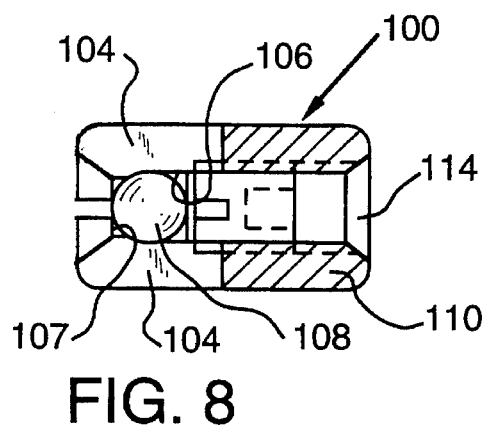
FIG. 8 is a longitudinal cross-sectional view of the removable locating pin of FIG. 7, with some of the elements thereof shown in full view for clarity.
Figure 9:
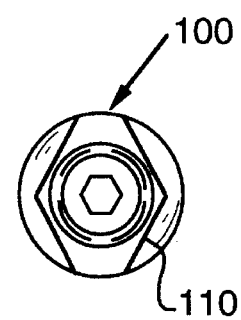
FIG. 9 is an end view of the removable locating pin of FIGS. 7 and 8.

As can be seen in FIG. 8, axial passage 106 has a smaller diameter 107 at the outer end thereof and houses a movable ball 108 therein. Thus to removably attach the locating pin 100 to the adaptor member 10, the expandable upper portion 102 is inserted into a bore 15 in the attachment surface 14 of the adaptor member 10 and set screw assembly 114 is advanced into contact with ball 108. As ball 108 is forced into the outer portion 107 of axial passage 106, the four arcuate segments 104 are forced outwardly to engage the inner surface of bore 15 to retain the pin 100 therein.

Figure 11:
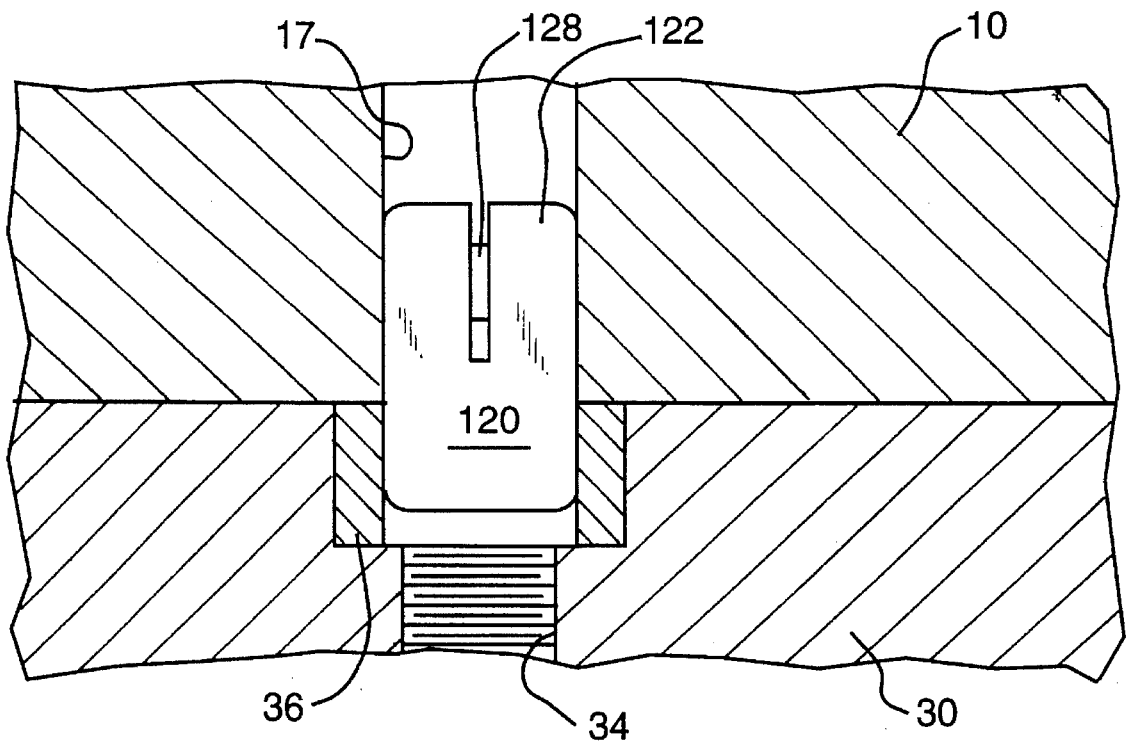
FIG. 11 is a partial cross-sectional assembly view of a column received on a preferred adaptor member of the present invention showing another preferred removable locating pin received in a corresponding bore in the adaptor member.
Figure 14:
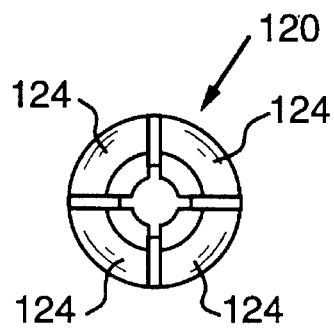
FIG. 14 is view of the opposite end of the removable locating pin of FIG. 13.

Similarly, locating pin 120 has an expandable upper portion 122 sized to be received in an attachment bore 17 provided in the attachment surface 14 of the adaptor member 10. Locating pin 120 also has a lower portion 130 that preferably has a circular cross-sectional shape adapted to be received in any one of the locating bushings 36 of support plate 30. See FIG. 11. The lower portion 130 has a threaded bore 132 extending therethrough that is adapted to receive a threaded set screw 134 assembly therein. The upper portion 122 preferably comprises four arcuate segments 124 that define an axial passage 126 therebetween that is substantially coaxially aligned with the threaded bore 132 in the lower portion 130.

Figure 12:
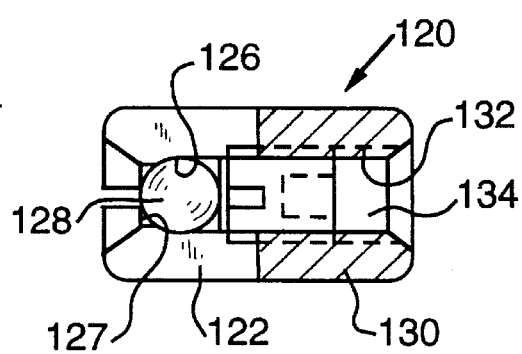
FIG. 12 is a longitudinal cross-sectional view of the removable locating pin of FIG. 11, with some of the elements thereof shown in full view for clarity.
Figure 13:
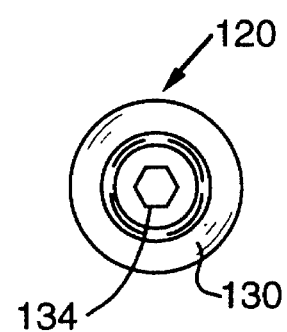
FIG. 13 is an end view of the removable locating pin of FIGS. 11 and 12.

As can be seen in FIG. 12 axial passage 126 has a smaller diameter 127 at the outer end thereof and houses a movable ball bearing 128 therein. Thus, to removably attach the locating pin 120 to the adaptor member 10, the expandable upper portion 122 is inserted into a bore 17 in the attachment surface 14 of the adaptor member 10 and set screw assembly 134 is advanced into contact with ball bearing 128. As ball bearing 128 is forced into the outer portion 127 of axial passage 126, the four arcuate segments 124 are forced outwardly to engage the inner surface of bore 17 to retain the pin 120 therein. It will be appreciated that pins 100 and 120 extend from the bottom surface of the adaptor member 10 and are capable of being inserted into any of two corresponding bushings 36 in the support plate 30 to precisely locate the adaptor member 10 on the support plate 30. It will be appreciated that when the locating pins (100, 120) engage locating bushings 36 in corresponding bores 32 on plate 30, the adaptor member 10 of the present invention will be precisely located on the support plate 30 in a predetermined position.

In this embodiment, the adaptor member 10 is attached to the support plate 30 by cap screws 31 that extend through bores 13 in the base to threadedly engage the threaded portion 34 of corresponding bores 32. See FIG. 2. The skilled artisan will appreciate that the adaptor member 10 can be attached to a support plate or other member in precise relationship to one another by a myriad of other known locating and fastening methods and apparatus without departing from the spirit and scope of the present invention. For example, the apparatus disclosed in my copending U.S. Patent Application entitled "Apparatus for Positioning An Element On A Surface", Ser. No. 08/300,375, that was mentioned above and herein incorporated by reference may also be successfully used to attach the adaptor 10 of the present invention to a support plate 30 in predetermined orientations. Plate 30 is accurately located and securely attached to the machine tool apparatus by known means.

In a preferred embodiment, the receiving surface of the adaptor member 10 has a "first" receiving cavity 20 therein that is sized to receive a first extended portion 64 of a corresponding first movable support member 62 and a "second" receiving cavity 22 that is sized to receive a second extended portion 70 of a corresponding second movable support member 68 of a clamping assembly 60. As can be seen in FIGS. 1 and 3, a "primary" transverse bore 24 is provided in the adaptor member 10 such that it extends on both sides of the first receiving cavity 20. Similarly, a "secondary" transverse bore 26 is provided through the adaptor 10 such that it extends on both sides of the second receiving cavity 22.

Also, to align one of the column surfaces 52 in a predetermined confronting relationship on the receiving surface 14 of the adaptor member 10, bores 27 and 28 are preferably provided in the receiving surface 14 of the adaptor member 10 for receiving corresponding locating pins (100, 120) of the type and construction described hereinabove that are removably attached to a surface 52 of the column 50. See FIGS. 2 and 4.

Preferably, every surface 52 of the column 50 has two pin locating bores 95 therein for selectively receiving removable pins (100, 120) therein. See FIG. 2. During machining operations, it will be appreciated that bores 95 are so located in the surfaces 52 of the column 50 such that they are always covered by the first and second jaws (80, 86), respectively, to prevent chips and other machining debris from entering therein.

Thus, to attach the column 50 to the adaptor 10, in a precise predetermined orientation, a center jaw 58 is removed from one of the column surfaces 52. In addition, the corresponding first and second jaw members (80, 86) are detached from their corresponding first and second movable support members (62, 68) by removing the corresponding pins 90 to thereby expose the first and second extended portions (64, 70). Also to facilitate precise alignment of the column 50 on the adaptor member 10 a locating pin 100 is inserted and attached, in the above-described manner, to one of the bores 95 in the surface 52 of column 50. Likewise, a locating pin 120 is inserted in and attached to the other bore 95 in that surface. Thereafter, the now exposed surface 52 is brought into confronting relationship with the receiving surface 12 such that the locating portions (102, 122) of the pins (100, 120), respectively, are received in corresponding bores 95 and the exposed first extended portion 64 is received in the first receiving cavity 20 and the exposed second extended portion 70 is received within the second receiving cavity 22. The corresponding screw shaft 74 may be rotated, if necessary, to align the first transverse bore 65 in the first extended portion 64 of the first movable support member 60 with the primary transverse bore 24 in the adaptor member 10 and also align the second transverse bore 72 in the second extended portion 70 with the secondary transverse bore 26 in the adaptor member 10. After the first transverse bore 65 is aligned with the primary transverse bore 24 and the second transverse bore 72 is aligned with the secondary transverse bore 26, the pins 90 that formerly attached the first and second jaw members (80, 86) to the first and second extended portions (64, 70), respectively, are inserted into aligned bores (65, 24) and (72, 26) to removably couple the column 50 to the adaptor member 10. When it thereafter becomes desirable to use the workholder column 50 in a different orientation and the present adaptor member 10 is no longer needed, the pins 90 that are coupling the column 50 to the adaptor member 10 are removed to enable the column 50 to be detached from the adaptor member 10. Thereafter the pins (100, 120) that are inserted into bore 95 in the surface 52 of the column 50 are also removed and the corresponding first and second jaw members (80, 86) are reattached in the manner described above.

Also in a preferred embodiment, an endplate 140 is attached to one end of the column 50, preferably by capscrews (not shown) to prevent chips and debris from entering the cavities 54 in the column 50. Similarly, on the opposite end of the column 50, a plurality of endplate segments 142 are attached to the column by capscrews 144 in the manner depicted in FIG. 1. Each end plate segment 142, preferably has an axial bore therethrough (not shown) that provides operational access to the end of the corresponding screw shaft 74. To prevent chips and debris from accumulating in those axial bores, a resilient cover 146 is pressed into each axial bore. Each resilient cover 146 is also has an access slit 150 through which the allen wrench 8 or other suitable tool may be inserted. See FIG. 3. In particular, the allen wrench 74 is inserted through the slit 150 to operably engage the corresponding screw shaft 74. After the wrench 74 has been removed, the slit 150 automatically closes to thereby prevent any debris or chip infiltration therein.

Accordingly, the present invention provides solutions to the aforementioned problems associated with vise-like workholding apparatuses. In particular, the present invention provides a relatively inexpensive means for mounting a standard column member that operably supports a plurality of vise-like workholders thereon on a tooling plate in a precise predetermined location wherein the axes of the clamping assemblies thereof are substantially parallel with the tooling surface without sacrificing the column's workpiece capabilities when used in other orientations. While such advantages are apparent from the foregoing disclosure, it will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for supporting a workholding assembly on a support surface wherein the workholding assembly includes a column member having at least two parallel, longitudinal surfaces, each longitudinal surface having a longitudinal cavity thereunder and corresponding first and second movable support members slidably supported within each longitudinal cavity, means for moving said first and second movable support members toward and away from one another, the first and second movable support members having first and second extended portions, respectively, which each extend out of the corresponding longitudinal cavity, a center jaw removably attached to at least one longitudinal surface and a first jaw member corresponding to said at least one first extended portion and being removably attached thereto and a second jaw member corresponding to said at least one second extended portion and being removably attached thereto, the apparatus comprising:

an adaptor member attachable to the support surface in a predetermined orientation, said adaptor member having a receiving surface adapted to receive in abutting confronting relationship another longitudinal column surface, said column receiving surface having first and second cavities therein adapted to receive the first and second extended portions corresponding to the longitudinal column surface received thereon;

locating means for locating the longitudinal column surface received on said receiving surface in a predetermined confronting orientation relative to said receiving surface; and means for removably attaching the first and second movable support members received within said first and second cavities, respectively, to said adaptor member.

2. The apparatus of claim 1 wherein each first extended portion has a first transverse bore extending therethrough and wherein each second extended portion has a second transverse bore extending therethrough and wherein said means for removably attaching the first and second movable support members received within said first and second cavities comprises:

a primary transverse bore extending through said first cavity in said adaptor member and being substantially coaxially aligned with the first transverse bore of the first movable support member received therein;

a secondary transverse bore extending through said second cavity in said adaptor member and being substantially coaxially aligned with the second transverse bore of the second movable support member received therein;

a first removable fastener adapted for axial insertion into both of said coaxially aligned primary and first transverse bores to removably retain therein the first movable support member received within said first cavity; and a second removable fastener adapted for axial insertion into both of said coaxially aligned secondary and second transverse bores to removably retain therein the second movable support member received within said second cavity.

3. The apparatus of claim 2 wherein said first removable fastener comprises a first removable attachment pin and wherein said second removable fastener comprises a second removable attachment pin.

4. The apparatus of claim 3 wherein each first jaw member is removably attached to a first extended portion of a corresponding movable support member by a corresponding first removable attachment pin and wherein each second jaw member is removably attached to a second extended portion of a corresponding second movable support member by a corresponding second removable attachment pin.

5. The apparatus of claim 3 wherein the first transverse bore in the first extended portion of each first movable support member has a first flat surface that extends therethrough and wherein said first removable attachment pin has a first planar portion adapted to substantially correspond to the first flat surface of the first transverse bore in the first extended portion received within said first cavity such that when said first removable attachment pin is axially inserted into the coaxially aligned primary and first bores, said first planar portion can selectively engage the first flat surface to selectively couple said adaptor member to the first extended portion received within said first cavity and wherein the second transverse bore in the second extended portion of each second movable support member has a second flat surface that extends therethrough and wherein said second removable attachment pin has a second planar portion adapted to substantially correspond to the second flat surface of the second transverse bore in the second extended portion received within said second cavity such that when said second removable attachment pin is axially inserted into the coaxially aligned secondary and second bores, said second planar portion can selectively engage the second flat surface to selectively couple said adaptor member to the second extended portion received within said second cavity.

6. The apparatus of claim 1 wherein said means for locating comprises:

a first locating pin selectively removably attachable to each longitudinal surface of the column member;

a second locating pin selectively removably attachable to each longitudinal surface of the column member;

a first locating bore in said receiving surface of said adaptor member, said first locating bore being sized to receive therein said first locating pin when said longitudinal surface is received on said receiving surface of said adaptor member; and a second locating bore in said receiving surface of said adaptor member, said second locating bore being sized to receive therein said second locating pin when said longitudinal surface is received on said receiving surface of said adaptor member.

7. A workholding apparatus adapted for attachment to a support surface of a member, comprising:

a column member having at least two parallel longitudinal surfaces, each longitudinal surface having a corresponding longitudinal cavity thereunder and corresponding first and second movable support members slidably supported within each longitudinal cavity, means for moving said first and second movable support members toward and away from one another, the first and second movable support members having first and second extended portions, respectively, which each extend out of the corresponding longitudinal cavity, a center jaw removably attached to at least one longitudinal surface and a first jaw member corresponding to at least one first extended portion and being removably attached thereto and a second jaw member corresponding to at least one second extended portion and being removably attached thereto;

an adaptor member attachable to the support surface in a predetermined orientation, said adaptor member having a receiving surface adapted to receive in abutting confronting relationship another longitudinal column surface, said column receiving surface having first and second cavities therein adapted to receive the first and second extended portions corresponding to the longitudinal column surface received thereon;

locating means for locating the longitudinal column surface received on said receiving surface in a predetermined confronting orientation relative to said receiving surface; and means for removably attaching the first and second movable support members received within said first and second cavities, respectively, to said adaptor member.

8. The apparatus of claim 7 wherein each first extended portion has a first transverse bore extending therethrough and wherein each second extended portion has a second transverse bore extending therethrough and wherein said means for removably attaching the first and second movable support members received within said first and second cavities comprises:

a primary transverse bore extending through said first cavity in said adaptor member and being substantially coaxially aligned with the first transverse bore of the first movable support member received therein;

a secondary transverse bore extending through said second cavity in said adaptor member and being substantially coaxially aligned with the second transverse bore of the second movable support member received therein;

a first removable fastener adapted for axial insertion into both of said coaxially aligned primary and first transverse bores to removably retain therein the first movable support member received within said first cavity; and a second removable fastener adapted for axial insertion into both of said coaxially aligned secondary and second transverse bores to removably retain therein the second movable support member received within said second cavity.

9. The apparatus of claim 8 wherein said first removable fastener comprises a first removable attachment pin and wherein said second removable fastener comprises a second removable attachment pin.

10. The apparatus of claim 9 wherein each first jaw member is removably attached to a first extended portion of a corresponding movable support member by a corresponding first removable attachment pin and wherein each second jaw member is removably attached to a second extended portion of a corresponding second movable support member by a corresponding second removable attachment pin.

11. The apparatus of claim 9 wherein the first transverse bore in the first extended portion of each first movable support member has a first flat surface that extends therethrough and wherein said first removable attachment pin has a first planar portion adapted to substantially correspond to the first flat surface of the first transverse bore in the first extended portion received within said first cavity such that when said first removable attachment pin is axially inserted into the coaxially aligned primary and first bores, said first planar portion can selectively engage the first flat surface to selectively couple said adaptor member to the first extended portion received within said first cavity and wherein the second transverse bore in the second extended portion of each second movable support member has a second flat surface that extends therethrough and wherein said second removable attachment pin has a second planar portion adapted to substantially correspond to the second flat surface of the second transverse bore in the second extended portion received within said second cavity such that when said second removable attachment pin is axially inserted into the coaxially aligned secondary and second bores, said second planar portion can selectively engage the second flat surface to selectively couple said adaptor member to the second extended portion received within said second cavity.

12. A workholding apparatus adapted for attachment to a support surface of a member, comprising:

a column member having a plurality of longitudinal surfaces, each longitudinal surface having a corresponding longitudinal cavity thereunder and corresponding first and second movable support members slidably supported within each longitudinal cavity, means for moving said first and second movable support members toward and away from one another, the first and second movable support members having first and second extended portions, respectively, which each extend out of the corresponding longitudinal cavity, a center jaw removably attached to at least one longitudinal surface and a first jaw member corresponding to at least one first extended portion and being removably attached thereto and a second jaw member corresponding to at least one second extended portion and being removably attached thereto;

an adaptor member attachable to the support surface in a predetermined orientation, said adaptor member having a receiving surface adapted to receive in abutting confronting relationship another longitudinal column surface, said column receiving surface having first and second cavities therein adapted to receive the first and second extended portions corresponding to the longitudinal column surface received thereon;

locating means for locating the longitudinal column surface received on said receiving surface in a predetermined confronting orientation relative to said receiving surface; and means for removably attaching the first and second movable support members received within said first and second cavities, respectively, to said adaptor member.

13. The apparatus of claim 12 wherein each first extended portion has a first transverse bore extending therethrough and wherein each second extended portion has a second transverse bore extending therethrough and wherein said means for removably attaching the first and second movable support members received within said first and second cavities comprises:

a primary transverse bore extending through said first cavity in said adaptor member and being substantially coaxially aligned with the first transverse bore of the first movable support member received therein;

a secondary transverse bore extending through said second cavity in said adaptor member and being substantially coaxially aligned with the second transverse bore of the second movable support member received therein;

a first removable fastener adapted for axial insertion into both of said coaxially aligned primary and first transverse bores to removably retain therein the first movable support member received within said first cavity; and a second removable fastener adapted for axial insertion into both of said coaxially aligned secondary and second transverse bores to removably retain therein the second movable support member received within said second cavity.

14. The apparatus of claim 13 wherein said first removable fastener comprises a first removable attachment pin and wherein said second removable fastener comprises a second removable attachment pin.

15. The apparatus of claim 14 wherein each first jaw member is removably attached to a first extended portion of a corresponding movable support member by a corresponding first removable attachment pin and wherein each second jaw member is removably attached to a second extended portion of a corresponding second movable support member by a corresponding second removable attachment pin.

16. The apparatus of claim 14 wherein the first transverse bore in the first extended portion of each first movable support member has a first flat surface that extends therethrough and wherein said first removable attachment pin has a first planar portion adapted to substantially correspond to the first flat surface of the first transverse bore in the first extended portion received within said first cavity such that when said first removable attachment pin is axially inserted into the coaxially aligned primary and first bores, said first planar portion can selectively engage the first flat surface to selectively couple said adaptor member to the first extended portion received within said first cavity and wherein the second transverse bore in the second extended portion of each second movable support member has a second flat surface that extends therethrough and wherein said second removable attachment pin has a second planar portion adapted to substantially correspond to the second flat surface of the second transverse bore in the second extended portion received within said second cavity such that when said second removable attachment pin is axially inserted into the coaxially aligned secondary and second bores, said second planar portion can selectively engage the second flat surface to selectively couple said adaptor member to the second extended portion received within said second cavity.

17. A workholding apparatus adapted for attachment to a support surface of a member, comprising:

a column member having three longitudinal workholding surfaces and a longitudinal attachment surface, said longitudinal workholding surfaces and said attachment surface each having a corresponding longitudinal cavity thereunder and corresponding first and second movable support members slidably supported within each longitudinal cavity, means for moving said first and second movable support members toward and away from one another, the first and second movable support members having first and second extended portions, respectively, which each extend out of the corresponding longitudinal cavity, a center jaw removably attached to each said longitudinal workholding surface and a first jaw member corresponding to each said corresponding first extended portion which extends out of said cavity under each said longitudinal workholding surface and being removably attached thereto and a second jaw member corresponding to each said second extended portion which extends out of said cavity under each said longitudinal workholding surface and being removably attached thereto;

an adaptor member attachable to the support surface in a predetermined orientation, said adaptor member having a receiving surface adapted to receive in abutting confronting relationship said longitudinal attachment surface, said column receiving surface having first and second cavities therein adapted to receive the first and second extended portions corresponding to said longitudinal attachment surface;

locating means for locating said longitudinal attachment surface on said receiving surface in a predetermined confronting orientation; and means for removably attaching the first and second movable support members received within said first and second cavities, respectively, to said adaptor member.

18. The apparatus of claim 17 wherein each first extended portion has a first transverse bore extending therethrough and wherein each second extended portion has a second transverse bore extending therethrough and wherein said means for removably attaching the first and second movable support members received within said first and second cavities comprises:

a primary transverse bore extending through said first cavity in said adaptor member and being substantially coaxially aligned with the first transverse bore of the first movable support member received therein;

a secondary transverse bore extending through said second cavity in said adaptor member and being substantially coaxially aligned with the second transverse bore of the second movable support member received therein;

a first removable fastener adapted for axial insertion into both of said coaxially aligned primary and first transverse bores to removably retain therein the first movable support member received within said first cavity; and a second removable fastener adapted for axial insertion into both of said coaxially aligned secondary and second transverse bores to removably retain therein the second movable support member received within said second cavity.

19. The apparatus of claim 18 wherein said first removable fastener comprises a first removable attachment pin and wherein said second removable fastener comprises a second removable attachment pin.

20. The apparatus of claim 19 wherein each first jaw member is removably attached to a first extended portion of a corresponding movable support member by a corresponding first removable attachment pin and wherein each second jaw member is removably attached to a second extended portion of a corresponding second movable support member by a corresponding second removable attachment pin.

21. The apparatus of claim 19 wherein the first transverse bore in the first extended portion of each first movable support member has a first flat surface that extends therethrough and wherein said first removable attachment pin has a first planar portion adapted to substantially correspond to the first flat surface of the first transverse bore in the first extended portion received within said first cavity such that when said first removable attachment pin is axially inserted into the coaxially aligned primary and first bores, said first planar portion can selectively engage the first flat surface to selectively couple said adaptor member to the first extended portion received within said first cavity and wherein the second transverse bore in the second extended portion of each second movable support member has a second flat surface that extends therethrough and wherein said second removable attachment pin has a second planar portion adapted to substantially correspond to the second flat surface of the second transverse bore in the second extended portion received within said second cavity such that when said second removable attachment pin is axially inserted into the coaxially aligned secondary and second bores, said second planar portion can selectively engage the second flat surface to selectively couple said adaptor member to the second extended portion received within said second cavity.

* * * * *